(12) United States Patent
Tanner et al.

(10) Patent No.: US 11,838,041 B2
(45) Date of Patent: Dec. 5, 2023

(54) ELECTRONIC DEVICE AND FIELD DEVICE

(71) Applicant: Endress+Hauser Flowtec AG, Reinach (CH)

(72) Inventors: Lukas Tanner, Basel (CH); Marc Fiedler, Reinach (CH)

(73) Assignee: Endress+Hauser Flowtec AG, Reinach (CH)

( * ) Notice: Subject to any disclaimer, the term of this patent is extended or adjusted under 35 U.S.C. 154(b) by 275 days.

(21) Appl. No.: 17/613,571

(22) PCT Filed: Apr. 22, 2020

(86) PCT No.: PCT/EP2020/061189
§ 371 (c)(1),
(2) Date: Nov. 23, 2021

(87) PCT Pub. No.: WO2020/239330
PCT Pub. Date: Dec. 3, 2020

(65) Prior Publication Data
US 2022/0247444 A1   Aug. 4, 2022

(30) Foreign Application Priority Data

May 28, 2019   (DE) ..................... 10 2019 114 323.3

(51) Int. Cl.
*H04B 1/3816*   (2015.01)
(52) U.S. Cl.
CPC ................... *H04B 1/3816* (2013.01)
(58) Field of Classification Search
CPC .............................. H04B 1/3816; G01D 21/00
(Continued)

(56) References Cited

U.S. PATENT DOCUMENTS

| | | | |
|---|---|---|---|
| 2002/0105234 A1* | 8/2002 | Ruat | G06K 7/006 |
| | | | 307/139 |
| 2009/0075646 A1* | 3/2009 | Lohlein | H04M 1/24 |
| | | | 455/423 |
| 2017/0264726 A1 | 9/2017 | Bezawada et al. | |

FOREIGN PATENT DOCUMENTS

| | | |
|---|---|---|
| CN | 1954276 A | 4/2007 |
| CN | 105324726 A | 2/2016 |

(Continued)

OTHER PUBLICATIONS

Stahl, R., GSM/GPRS—Modem zur Fernüberwachung im Ex-Bereich, MaschinenMarkt, Jul. 23, 2009, 1 p.

*Primary Examiner* — Eugene Yun
(74) *Attorney, Agent, or Firm* — Mark A. Logan; Endress+Hauser (USA) Holding, Inc.

(57) ABSTRACT

Disclosed is an electronic device comprising: a radio module designed to exchange information; an interface device designed to receive a SIM card, the interface device having a data interface, a clock interface, a reset interface and a supply interface designed to supply power to the SIM card; and a circuit board, on which the radio module and the interface device are arranged and electrically connected to one another; characterised in that the radio module has a voltage specification circuit and an associated voltage output, which voltage specification circuit is designed to specify an operating voltage for the SIM card, a fourth electrical connection having a decoupling circuit with power-limited output to the supply interface, which decoupling circuit is designed to decouple the voltage specification and energy supply of the SIM card from one another.

10 Claims, 3 Drawing Sheets

(58) Field of Classification Search
USPC .................................................... 455/575.1
See application file for complete search history.

(56) References Cited

FOREIGN PATENT DOCUMENTS

| | | |
|---|---|---|
| CN | 109074176 A | 12/2018 |
| DE | 102004020393 A1 | 11/2005 |
| DE | 102011084789 A1 | 4/2013 |
| DE | 102016106179 A1 | 10/2017 |
| EP | 2040297 A1 | 3/2009 |
| EP | 3217500 A1 | 9/2017 |
| WO | 2007045669 A1 | 4/2007 |

\* cited by examiner

ELECTRONIC DEVICE AND FIELD DEVICE

CROSS-REFERENCE TO RELATED APPLICATIONS

The present application is related to and claims the priority benefit of German Patent Application No. 10 2019 114 323.3, filed on May 28, 2019, and International Patent Application No. PCT/EP2020/061189, filed on Apr. 22, 2020, the entire contents of which are incorporated herein by reference.

TECHNICAL FIELD

The invention relates to an electronic device of a field device with a radio module designed to operate a SIM card, and to a field device with such a device.

BACKGROUND

Electronic devices with a radio module which use a SIM card for data transmission or communication are already known, as disclosed in EP3217500A1, for example. When using a SIM card, the SIM card is separated from a radio module by means of an interface, wherein the interface is designed to ensure EX-safe operation according to the ETSI standard with respect to the RED Directive 2014/53/EU (Radio Equipment Directive).

Modern radio modules have internal voltage regulation, as a result of which the interface taught in EP3217500A1 is obsolete.

SUMMARY

The aim of the invention is therefore to propose an electronic device and a field device by means of which EX-safe operation of a SIM card is ensured.

An electronic device according to the invention comprises:
- a radio module designed to exchange information;
- an interface device designed to receive a SIM card, wherein the interface device has a data interface, a clock interface, a reset interface, and a supply interface designed to supply power to the SIM card;
- a circuit board, on which the radio module and the interface device are arranged and electrically connected to one another;
- wherein the radio module has a clock pulse generator designed to generate a clock signal,
- wherein the following electrical connections are configured between the radio module and the interface device:
- a first electrical connection for bi-directional data transmission between the radio module and the SIM card;
- a second electrical connection for transmitting a clock signal to the SIM card;
- a third electrical connection for transmitting a reset signal to the SIM card;
- a fourth electrical connection for specifying the operating voltage,
- wherein the electronic circuit has a power supply unit designed to operate the radio module and the SIM card, wherein a fifth electrical connection is configured between the power supply unit and the SIM card, and a sixth electrical connection is configured between the power supply unit and the radio module,
- wherein the first connection through fifth connection each have a resistor element designed for power limiting,
- wherein the radio module has a voltage specification circuit and an associated voltage output, which voltage specification circuit is designed to specify an operating voltage for the SIM card, the fourth electrical connection has a decoupling circuit with power-limited output to the supply interface, which decoupling circuit is designed to decouple the voltage specification and power supply of the SIM card from one another,
- wherein intrinsically safe operation of the SIM card according to Ex i—especially, Ex is and/or EX ib-IEC 60079-11 Edition 6.0 2011-06 is ensured by means of the decoupling.

The SIM card meets the ETSI standard, TS102221 V15.1.0 (2018-12).

In one embodiment, the decoupling circuit comprises an operational amplifier and a transistor, wherein the operational amplifier has two inputs and one output and an interface for the power supply unit, which interface is connected to the electrical line of the fifth electrical connection,
wherein the resistor element for power limiting is arranged between the radio module and an inverting input of the operational amplifier,
wherein the output of the operational amplifier is connected to a base or a gate of the transistor,
wherein a current input of the transistor is connected to the fifth electrical connection,
wherein a non-inverting input of the operational amplifier is connected to a current output, connected to the SIM card, of the transistor.

In one embodiment, the radio module can be operated with a first operating voltage V1, and wherein the radio module is designed to specify a second operating voltage V2 for the SIM card, wherein V1 is greater than V2.

In one embodiment, V1 is greater than 3.5 V, and wherein V2 is less than 3.2 V.

In one embodiment, the resistor element of the first connection has a resistance between 30 Ohms and 500 Ohms,
wherein the resistor element of the second connection has a resistance between 30 Ohms and 500 Ohms,
wherein the resistor element of the third connection has a resistance between 30 Ohms and 5 kOhms,
wherein the resistor element of the fourth connection has a resistance between 30 Ohms and 500 kOhms,
wherein the resistor element of the fifth connection has a resistance between 10 Ohms and 500 Ohms.

In this way, if the radio module and/or the SIM card fails, power delivered to the SIM card can be limited.

In one embodiment, a storage capacitor connected to a ground is arranged between the current output of the transistor and the supply interface,
and wherein a seventh connection with a discharge resistor element is configured to be parallel to the fourth connection between the voltage output of the radio module and the supply interface.

In one embodiment, a filter resistor element and a filter capacitor are connected in series in parallel to the inverting input of the operational amplifier and to the output of the operational amplifier.

In this way, undesired high-frequency fluctuations of an output voltage at the output of the operational amplifier can be avoided, so that the transistor can be operated stably.

In one embodiment, the decoupling circuit comprises an operational amplifier, wherein the operational amplifier has two inputs and one output and an interface for supplying power, which interface is connected to the electrical line of the fifth electrical connection, wherein the at least one resistor element for limiting power is arranged between the radio module and the non-inverting input of the operational amplifier, and the inverting input of the operational amplifier is connected to the output of the operational amplifier and to the power supply of the SIM card.

A measurement/automation technology field device according to the invention comprises:
- a transducer;
- an electronic measuring/operating circuit designed to operate the transducer and to provide measured values;
- an electronic device according to one of the preceding claims;
- a housing module for accommodating the electronic measuring/operating circuit and the electronic device,
  wherein the electronic measuring/operating circuit is designed to operate the radio module.

In one embodiment, the field device has a SIM card which is connected to the electronic device via the interface device.

BRIEF DESCRIPTION OF THE DRAWINGS

The invention will now be described with reference to exemplary embodiments.

DETAILED DESCRIPTION

Figure 1:
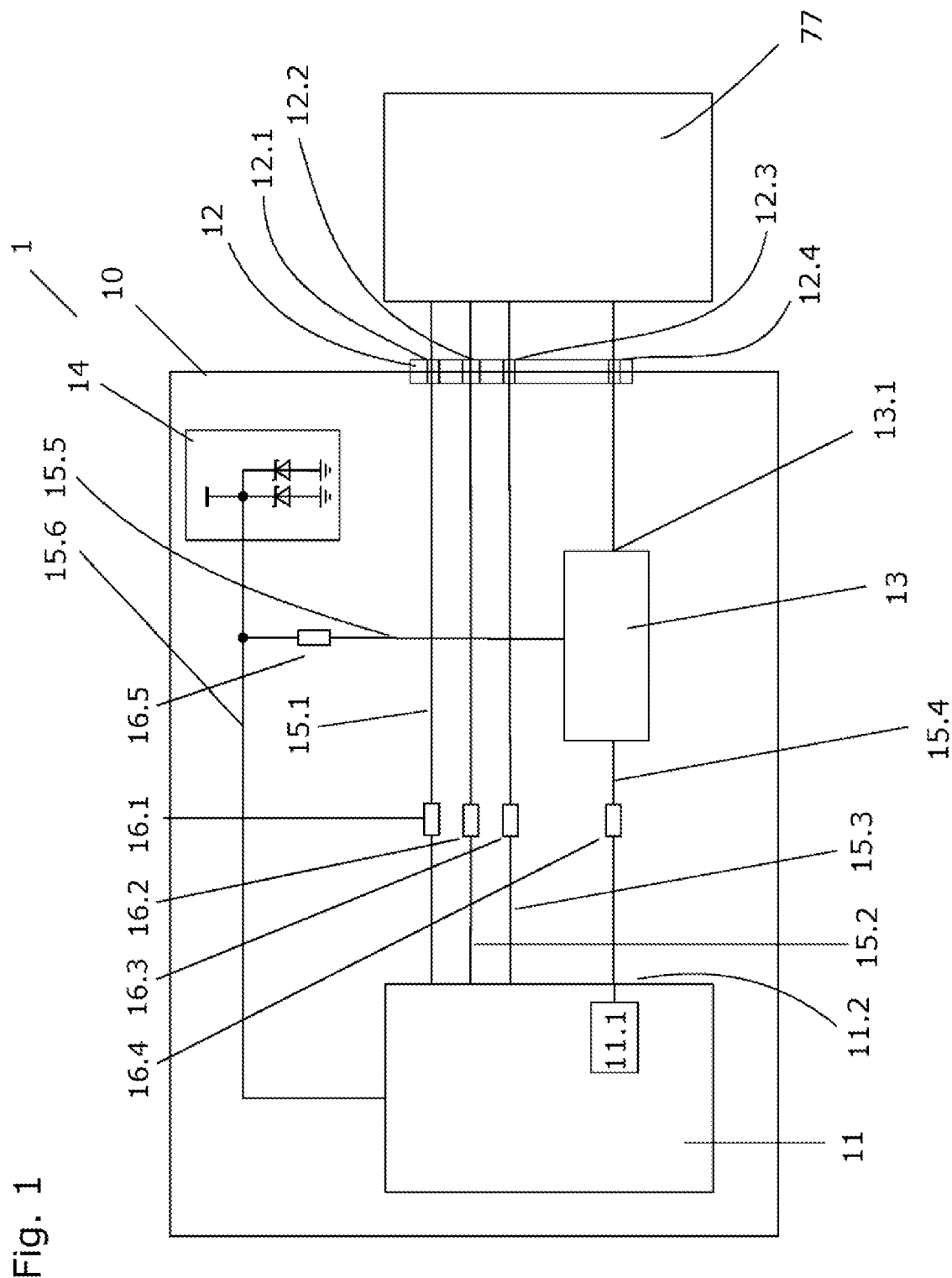
FIG. 1 shows a sketch of an exemplary electronic device according to the present disclosure with a decoupling circuit according to the present disclosure.

FIG. 1 illustrates the schematic structure of an exemplary electronic device 1 according to the invention with a circuit board 10, on which a radio module 11, an interface device 12 designed to receive a SIM card 77, an exemplary decoupling circuit 13 according to the invention, and a power supply unit 14 are arranged. The radio module has a voltage specification circuit 11.1, which is designed to output a voltage at the voltage output 11.2 and to supply it to the decoupling circuit via a fourth electrical connection. When the SIM card 77 is inserted, the radio module is connected to the SIM card via the interface device by means of electrical connections 15, wherein a first electrical connection 15.1 is designed for bi-directional data transmission between the radio module and the SIM card, and a second electrical connection 15.2 is designed to transmit a clock signal to the SIM card, and a third electrical connection 15.3 is designed to transmit a reset signal to the SIM card, and a fourth electrical connection 15.4 is designed to specify an operating voltage of the SIM card. Starting from the power supply unit 14, the SIM card is supplied with power via a fifth electrical connection 15.5, and the radio module is supplied with power via a sixth electrical connection 15.6. In this case, the fifth electrical connection is routed to the decoupling circuit and, via an output 13.1, routed to the decoupling circuit of the interface device.

The fifth electrical connection and sixth electrical connection may, as shown in FIG. 1, be, in sections, the same up to a node.

The fifth electrical connection and the fourth electrical connection are, as in FIG. 1, brought together by the decoupling circuit.

The electrical connections between the radio module and the SIM card are closed by means of interfaces 12.1, 12.2, 12.3, 12.4 of the interface device 12, wherein 12.1 is a data interface, 12.2 is a clock interface, 12.3 is a reset interface, and 12.4 is a supply interface.

Depending upon the SIM card, the operating voltage has a certain value; this value may be 1.8 V or 3 V, for example. Initializing the SIM card comprises specifying a first, low voltage to the SIM card, e.g., 1.8 V, and checking whether the SIM card transmits an electrical signal via the first electrical connection 15.1 after applying a reset signal or a voltage pulse via the third electrical connection. If not, then the voltage is raised to a further, higher value—for example, 3 volts. This process can be repeated one or more times. Initialization is completed when an electrical signal emitted by the SIM card is received at the radio module.

In order to be able to use such an electronic device in an EX area, it must be designed such that an explosion does not occur or does not spread. Since a SIM card must be easily accessible, spatial limitation of an explosion occurring in the area of the SIM card cannot be implemented in a user-friendly manner, such that an explosion must be avoided. For proper operation, the radio module 11 must be operated with a power which may be well be above a limit for explosion avoidance and is therefore encapsulated. If the radio module fails, this power must therefore be prevented from being delivered to the SIM card. According to the invention, the decoupling circuit 13 is provided, which is designed to separate the voltage specification from the power supply of the SIM card. Furthermore, resistor elements 16.1 through 16.5, which have a power-limiting effect, are provided in the first electrical connection through fifth electrical connection.

Figure 2:
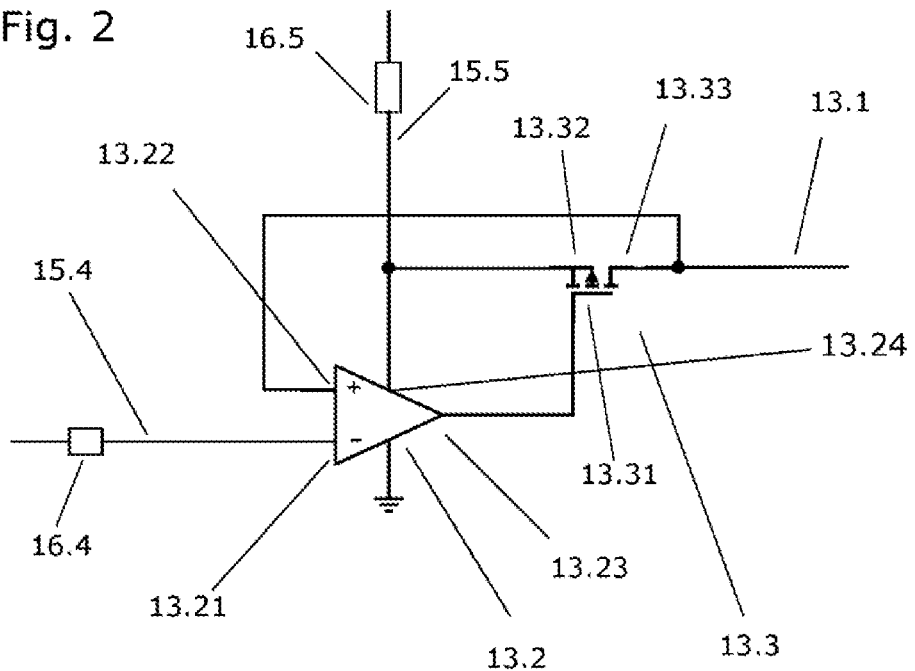
FIGS. 2, 3, and 4 illustrate exemplary decoupling circuits according to the present disclosure.
Figure 3:
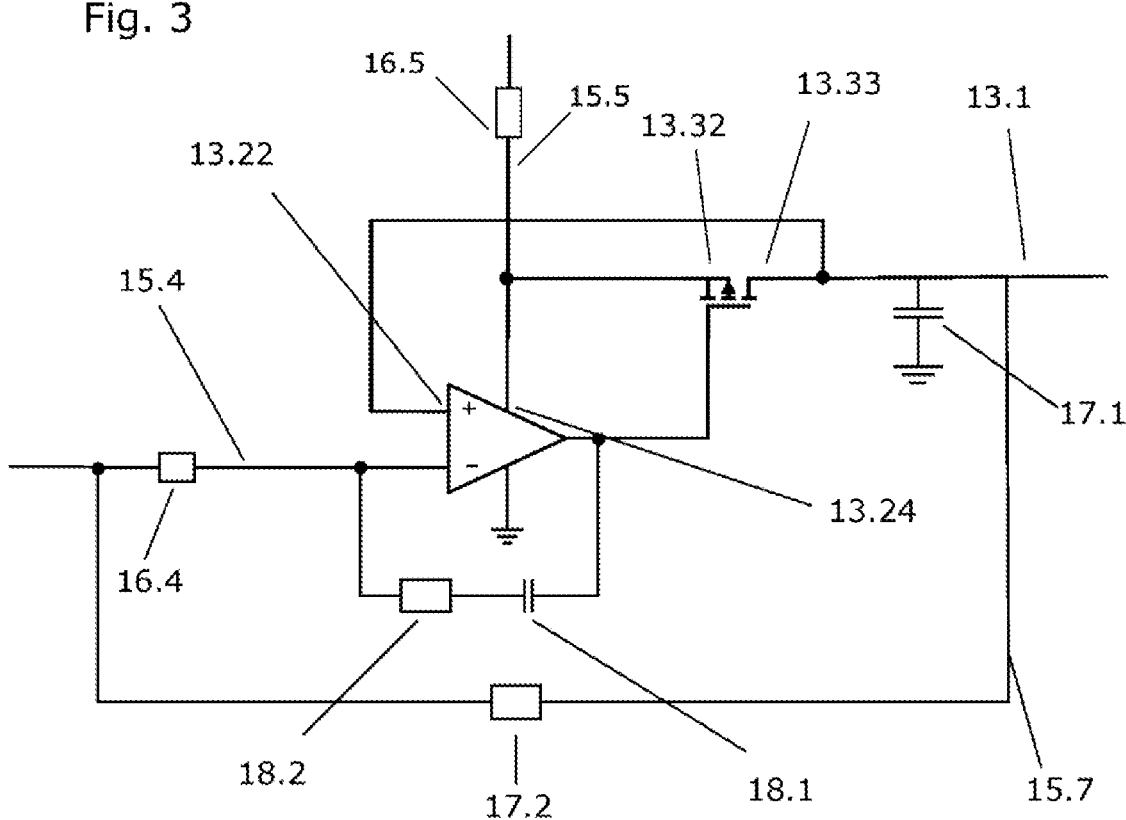
Figure 4:
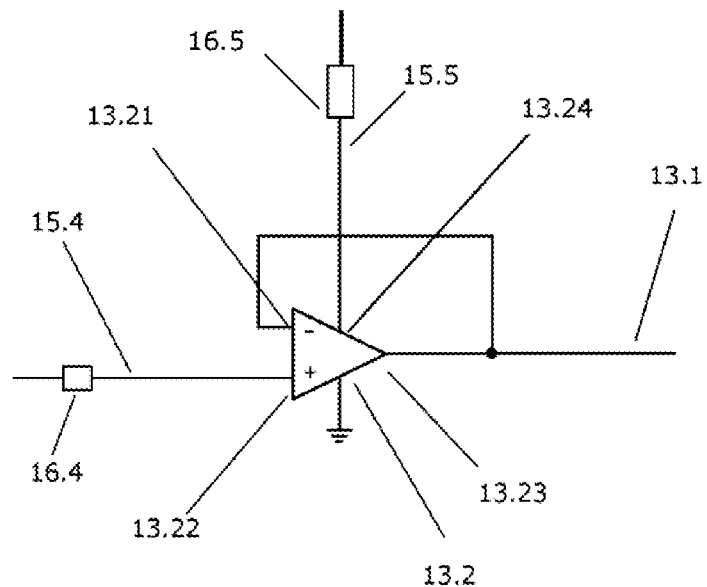

Exemplary decoupling circuits according to the invention are shown in FIGS. 2 through 4.

FIG. 2 shows a decoupling circuit comprising an operational amplifier 13.2 and a transistor 13.3, wherein the operational amplifier has an inverting input 13.21, a non-inverting input 13.22, an output 13.23, and an interface 13.24 to the power supply unit 14 for the purpose of supplying power, and wherein the transistor 13.3 has a control input or base or gate 13.31, a current input 13.32, and a current output 13.32. The fifth electrical connection is in this case routed to the current input 13.32 of the transistor and to the operational amplifier 13.2 for the purpose of supplying power. The current output 13.33 of the transistor corresponds to the power-limited output 13.1 of the decoupling circuit, wherein an electrical voltage applied at the current output 13.33 is fed back to the non-inverting input 13.22 of the operational amplifier. The inverting input 13.21 is charged with the fourth electrical connection 15.4. The output 13.23 of the operational amplifier is routed to the control input 13.31 of the transistor. A voltage applied to the inverting input of the transistor by specifying an electrical voltage by the radio module is also applied to the current output of the transistor by appropriate regulation by the operational amplifier and transistor, wherein the electrical power for operating the SIM card is provided almost exclusively by the electrical supply unit 14 via the fifth electrical line 15.5.

FIG. 3 illustrates two additions to the decoupling circuits shown in FIG. 2, wherein the additions, as shown in FIG. 3, may be used together or also alternatively.

One addition comprises a filter circuit with a filter resistor element 18.2 connected in series with a filter capacitor 18.1, which are arranged in a feedback path between the output of the operational amplifier and the inverting input of the operational amplifier. In connection with resistor element 16.4, the feedback path consisting of filter capacitor 18.1 and filter resistor element 18.2 reduces the amplification of the operational amplifier for high frequencies. Undesired high-frequency fluctuations are thus prevented, and the circuit stabilized. The amplification resulting from filter resistor element 18.2 and resistor element 16.4 can amount to between 1 and 100. The time constant, which can be set by selecting a capacitance of the filter capacitor 18.1 and a resistance value of the resistor element 16.4, is in the range of 100 ns to 100 µs, adapted to properties of the transistor and operational amplifier used.

A person skilled in the art is able to select the components of the decoupling circuit according to his requirements.

One addition comprises a storage capacitor 17.1 and a discharge resistor element 17.2, wherein the storage capacitor is applied between the current output 13.33 of the transistor and a ground, and wherein the discharge resistor element is arranged in a seventh electrical connection 15.7, which seventh electrical connection contacts the current output 13.33 and the fourth electrical connection, wherein the contact between the seventh electrical connection and fourth electrical connection is established between the fourth resistor element and voltage output 11.2 of the radio module (see FIG. 1). The capacitor 17.1 serves to deliver power for short power peaks, which may be required by the SIM card. This prevents the power from having to be delivered by the power supply unit 14, which stabilizes the voltage and reduces demands on the power supply unit. The discharge resistor element 17.2 serves to discharge the storage capacitor 17.1 in a controlled manner when it is switched off, wherein the discharge resistor element has a higher resistance—in particular, at least three times higher—than resistor element 16.5.

FIG. 4 shows an alternative embodiments to the embodiments shown in FIGS. 2 and 3, wherein the output 13.23 of the operational amplifier is fed back to the inverting input of the operational amplifier, and wherein the fourth connection 15.4 is connected to the non-inverting input of the operational amplifier. In this case, the fifth electrical connection is routed to the operational amplifier 13.2 for the purpose of supplying power. Also in this case, a decoupling of the voltage specification and power supply takes place, since the electrical power of the operational amplifier delivered via the output is mainly obtained via the fifth electrical connection. The embodiment shown in FIG. 4 is a simpler implementation of a decoupling circuit, but has increased demands on the operational amplifier and requires a higher supply voltage via the fifth electrical connection. The operational amplifier must be able to drive the current required by the SIM card, and the minimum voltage difference between the feeding of the operational amplifier and its output must not be too large.

Figure 5:
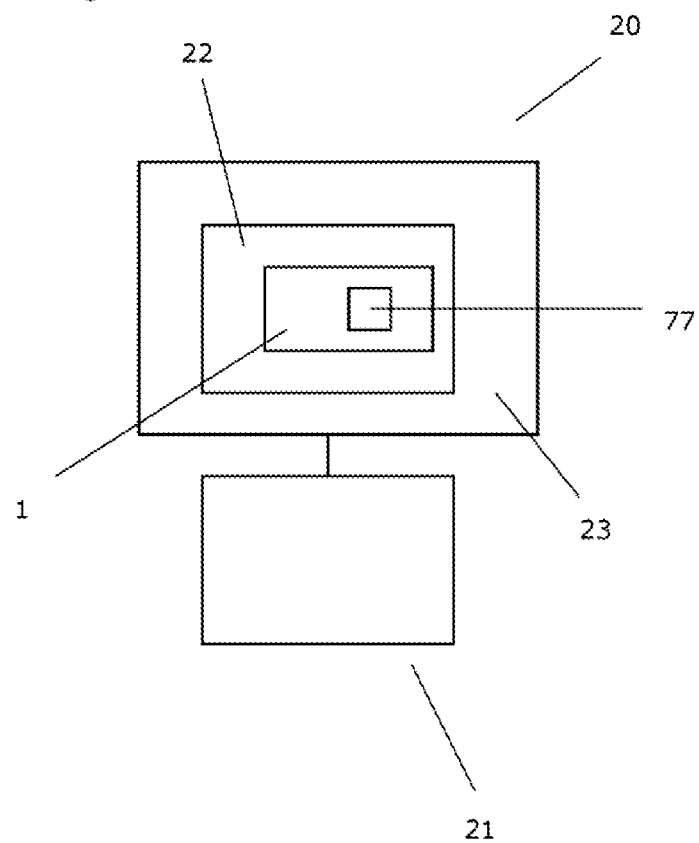
FIG. 5 shows a schematic representation of a measurement and automation technology field device.

FIG. 5 schematically illustrates the structure of an exemplary measurement and automation technology field device 20 with a transducer 21 for measuring a measurand and providing measured values of the measurand, an electronic measuring/operating circuit 22, an electronic device 1 according to the invention, and a provided SIM card 77. The electronic measuring/operating circuit is arranged in a housing module 23 and is designed to operate the transducer, the electronic device, and the SIM card.

The invention claimed is:

1. An electronic device, comprising:
a radio module including a clock pulse generator designed to generate a clock signal, wherein the radio module is designed to exchange information;
an interface device designed to receive a subscriber identification module (SIM) card, wherein the interface device has a data interface, a clock interface, a reset interface, and a supply interface designed to supply power to the SIM card; and
a circuit board on which the radio module and the interface device are arranged and electrically connected to one another;
wherein the following electrical connections are configured between the radio module and the interface device:
a first electrical connection for bi-directional data transmission between the radio module and the SIM card;
a second electrical connection for transmitting a clock signal to the SIM card;
a third electrical connection for transmitting a reset signal to the SIM card; and
a fourth electrical connection for specifying an operating voltage,
the electronic device further comprises a power supply unit designed to operate the radio module and the SIM card, wherein a fifth electrical connection is configured between the power supply unit and the SIM card, and a sixth electrical connection is configured between the power supply unit and the radio module,
wherein the first connection through fifth connection each have at least one resistor element designed for power limiting,
wherein the radio module has a voltage specification circuit and an associated voltage output, and voltage specification circuit is designed to specify an operating voltage for the SIM card,
wherein the fourth electrical connection has a decoupling circuit with power-limited output to the supply interface, wherein the decoupling circuit is designed to decouple the voltage specification and power supply of the SIM card from one another, and wherein intrinsically safe operation of the SIM card according to Ex i according to IEC 60079-11 Edition 6.0 2011-06 is ensured by means of the decoupling.

2. The electronic device according to claim 1,
wherein the decoupling circuit includes an operational amplifier and a transistor, wherein the operational amplifier has an inverting input, a non-inverting input, an output, and an interface to the power supply unit, wherein the interface to the power supply unit is connected to the electrical line of the fifth electrical connection,
wherein the resistor element of the fourth electrical connection for power limiting is arranged between the radio module and the inverting input of the operational amplifier,
wherein the output of the operational amplifier is connected to a base or a gate of the transistor,
wherein a current input of the transistor is connected to the fifth electrical connection, and
wherein the non-inverting input of the operational amplifier is connected to a current output, connected to the SIM card, of the transistor.

3. The electronic device according to claim 2,
wherein a storage capacitor connected to a ground is arranged between the current output of the transistor and the supply interface, and wherein a seventh connection with a discharge resistor element is configured to be parallel to the fourth connection between the voltage output of the radio module and the supply interface.

4. The electronic device according to claim 2, wherein a filter resistor element and a filter capacitor connected in series are connected in parallel with the inverting input of the operational amplifier and the output of the operational amplifier.

5. The electronic device according to claim 1, wherein the radio module is embodied to be operated with a first operating voltage, and wherein the radio module is designed to specify a second operating voltage for the SIM card, wherein the first operating voltage is greater than the second operating voltage.

6. The electronic device according to claim 5, wherein the first operating voltage is greater than 3.5 V, and the second operating voltage is less than 3.2 V.

7. The electronic device according to claim 1, wherein the resistor element of the first connection has a resistance between 30 Ohms and 500 Ohms, wherein the resistor element of the second connection has a resistance between 30 Ohms and 500 Ohms, wherein the resistor element of the third connection has a resistance between 30 Ohms and 5 kOhms, wherein the resistor element of the fourth connection has a resistance between 30 Ohms and 500 kOhms, and wherein the resistor element of the fifth connection has a resistance between 10 Ohms and 500 Ohms.

8. The electronic device according to claim 1, wherein the decoupling circuit includes an operational amplifier having an inverting input and a non-inverting input, an output, and an interface to the power supply, wherein the interface to the power supply is connected to the electrical line of the fifth electrical connection, wherein the resistor element for limiting power is arranged between the radio module and the non-inverting input of the operational amplifier, and the inverting input of the operational amplifier is connected to the output of the operational amplifier and to the power supply of the SIM card.

9. An automation technology field device, comprising:
a transducer;
an electronic measuring and operating circuit designed to operate the transducer and to provide measured values;
an electronic device, including:
  a radio module including a clock pulse generator designed to generate a clock signal, wherein the radio module is designed to exchange information;
  an interface device designed to receive a subscriber identification module (SIM) card, wherein the interface device has a data interface, a clock interface, a reset interface, and a supply interface designed to supply power to the SIM card;
  a circuit board on which the radio module and the interface device are arranged and electrically connected to one another;
  wherein the following electrical connections are configured between the radio module and the interface device:
    a first electrical connection for bi-directional data transmission between the radio module and the SIM card;
    a second electrical connection for transmitting a clock signal to the SIM card;
    a third electrical connection for transmitting a reset signal to the SIM card; and
    a fourth electrical connection for specifying an operating voltage,
  the electronic device further comprises a power supply unit designed to operate the radio module and the SIM card, wherein a fifth electrical connection is configured between the power supply unit and the SIM card, and a sixth electrical connection is configured between the power supply unit and the radio module,
  wherein the first connection through fifth connection each have at least one resistor element designed for power limiting,
  wherein the radio module has a voltage specification circuit and an associated voltage output, and voltage specification circuit is designed to specify an operating voltage for the SIM card,
  wherein the fourth electrical connection has a decoupling circuit with power-limited output to the supply interface, wherein the decoupling circuit is designed to decouple the voltage specification and power supply of the SIM card from one another, and wherein intrinsically safe operation of the SIM card according to Ex i according to IEC 60079-11 Edition 6.0 2011-06 is ensured by means of the decoupling; and
a housing module for accommodating the electronic measuring and operating circuit and the electronic device, wherein the electronic measuring and operating circuit is designed to operate the radio module.

10. The automation technology field device according to claim 9, wherein the field device has a SIM card which is connected to the electronic device via the interface device.

* * * * *